June 21, 1932.  I. E. HENDRICKSON  1,864,246
IMPULSE COUPLING
Filed June 18, 1931  3 Sheets-Sheet 1
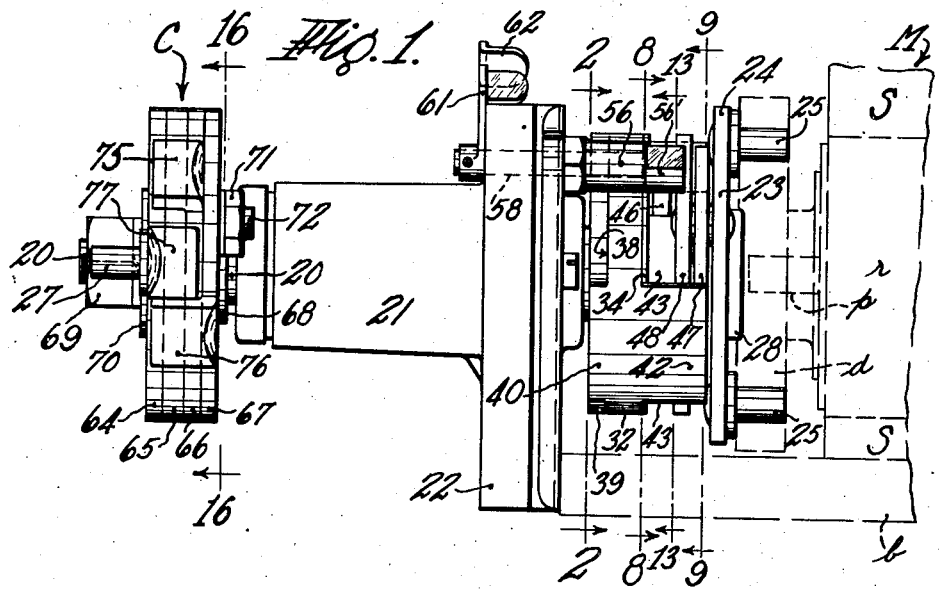
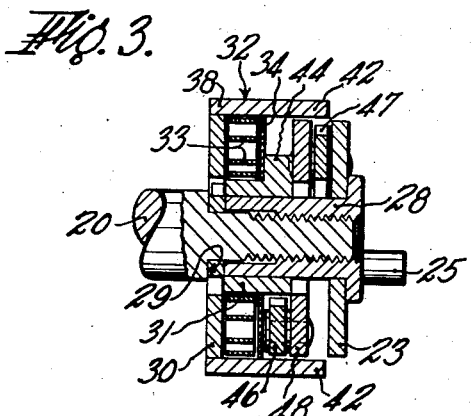
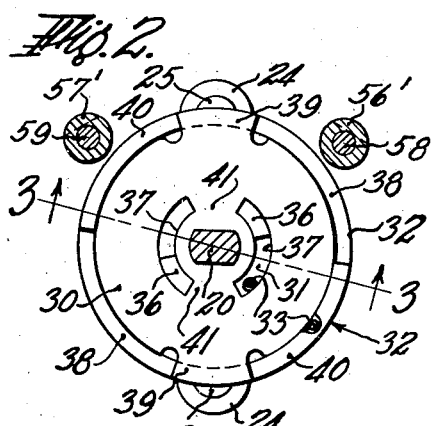
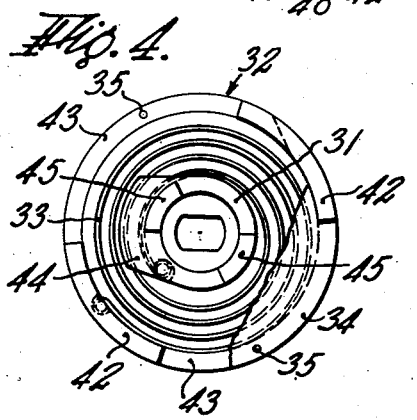
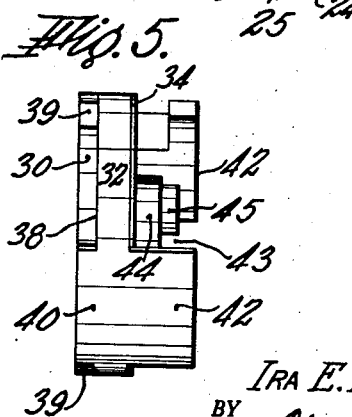
INVENTOR.
IRA E. HENDRICKSON
BY Chapin + Neal
ATTORNEYS.

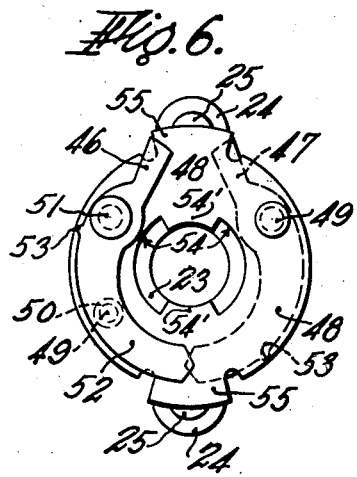
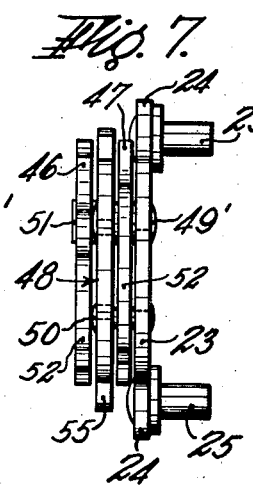
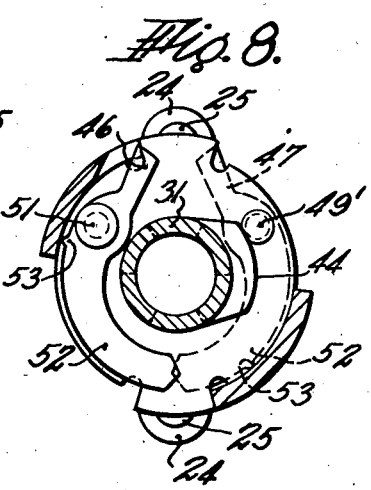
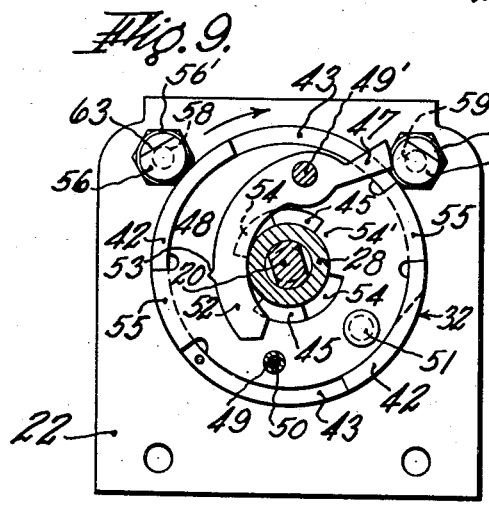
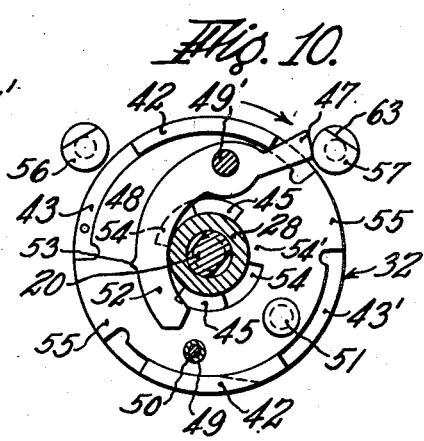
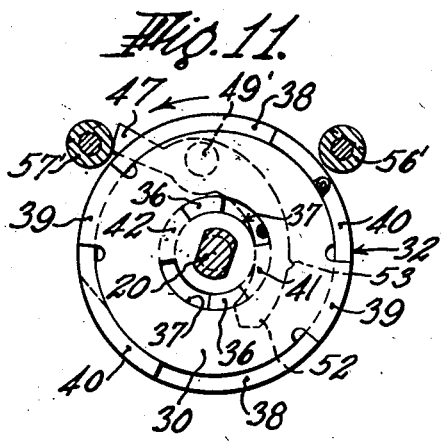
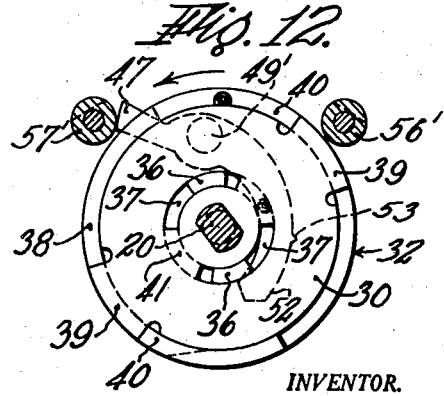
INVENTOR.
IRA E. HENDRICKSON
BY Chapin + Neal
ATTORNEYS.

INVENTOR.
IRA E. HENDRICKSON
BY Chapin + Neal
ATTORNEYS.

Patented June 21, 1932

1,864,246

UNITED STATES PATENT OFFICE

IRA E. HENDRICKSON, OF TULSA, OKLAHOMA, ASSIGNOR TO WICO ELECTRIC COMPANY, OF WEST SPRINGFIELD, MASSACHUSETTS, A CORPORATION OF MASSACHUSETTS

IMPULSE COUPLING

Application filed June 18, 1931. Serial No. 545,244.

This invention relates to improvements in impulse couplings, such as are used in the driving connections between an internal combustion engine and a magneto.

The broad object of this invention is to provide an impulse coupling which is effective to produce an impulse when rotating in either direction.

The most important use now contemplated for the invention, although not necessarily the only one, is in connection with certain types of engines which are not easily cranked in the ordinary way. Certain large single-cylinder two-cycle engines, for example, have such high compression as to make it practically impossible to turn them over without resort to special power means. Such engines may, however, be started manually, if rocked back against the compression, provided effective ignition is available at the proper time. The common type of single acting impulse coupling may be applied to a magneto in such a way that the impulse occurs when the crankshaft is turned in a direction opposite to its normal direction of rotation. With an impulse coupling so applied and adjusted to cause ignition well in advance of the top dead center of piston, the engine, when rocked back against compression, may be kicked over in its normal direction of rotation so that the piston will reach top dead center with a charge in the cylinder ready for ignition. But the speed of rotation of the engine, and of the magneto as well, at the time the piston reaches top dead center is often so slow that the magneto will not ignite the charge. The present invention provides, in addition to the ordinary impulse, which is effective at or near top dead center position of the piston with normal rotation, an additional impulse which is effective on reverse rotation at a point in the upstroke of the piston substantially before top dead center position is reached. Then, when the piston is moved back against compression (by turning the crankshaft in a direction opposite to its normal direction of rotation), the reverse acting impulse will function at the proper point, causing ignition and thereby causing the engine to rotate in its normal direction of rotation over top dead center into a position for the forward acting impulse to function in the normal way.

The invention, according to one feature, combines in a single unitary structure, provisions for both forward acting and reverse acting impulses. A single drive spring is used to function in both operations. The extremities of this spring are fixed, one to each of two relatively rotatable members. On one direction of rotation of the drive shaft, one of these members will be driven and the other held stationary while the drive spring is stressed. On a reverse rotation of the drive shaft, the second named member will be returned by the drive shaft while the other is held stationary during the stressing of the drive spring. Locking pawls or dogs, preferably automatically rendered ineffective by centrifugal action except on low drive shaft speeds, are provided one for each member to hold it stationary when required,—such pawls cooperating with stationary abutments in the usual well-known way.

The invention also features a special coupling, interposed between the engine drive shaft and the drive shaft of the impulse coupling,—such special coupling having provisions for lost motion, preferably variable in degree, whereby the engine drive shaft, on reverse rotation, moves idly through a small angle before driving the impulse coupling. This lost motion provision contributes to the work of the reverse acting impulse to cause ignition at the right point in the stroke of the engine piston, when the latter is rocked back against compression. In many cases, the reverse impulse could not, as a practical matter, be produced at the proper time but for the additional angular lag afforded by the lost motion provisions of the special coupling.

There are many other features contributing to the accomplishment of the objects above set forth and these will best appear as the detailed description proceeds.

The invention will be disclosed with reference to the accompanying drawings, in which:—

Fig. 1 is a side elevational view of an impulse coupling embodying the invention;

Fig. 2 is a cross sectional view taken on the line 2—2 of Fig. 1;

Fig. 3 is a sectional view taken on the line 3—3 of Fig. 2;

Figs. 4 and 5 are end and side elevational views, respectively, of one unit of the coupling,—such unit including the drive spring and the latch-releasing cams;

Figs. 6 and 7 are end and side elevational views of another unit of the coupling, such unit including the locking pawls;

Fig. 8 is a cross sectional view taken on the line 8—8 of Fig 1;

Fig. 9 is a cross sectional view taken on the line 9—9 of Fig. 1 but showing the parts in latching position for momentarily arresting rotation of the driven element in one direction while the drive spring is being stressed;

Fig. 10 is a generally similar view, showing the parts as positioned at the start of the latch releasing operation;

Figure 13:
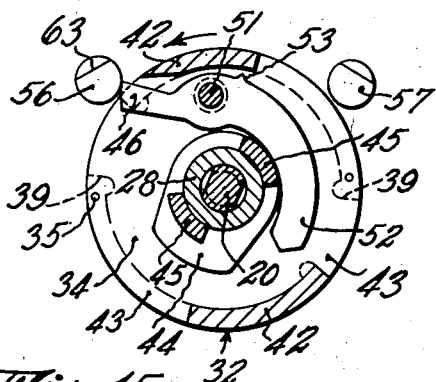
Figure 14:
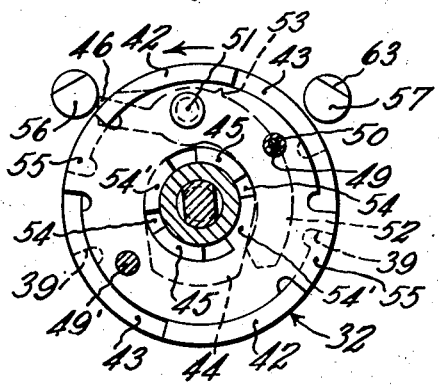
Figure 15:
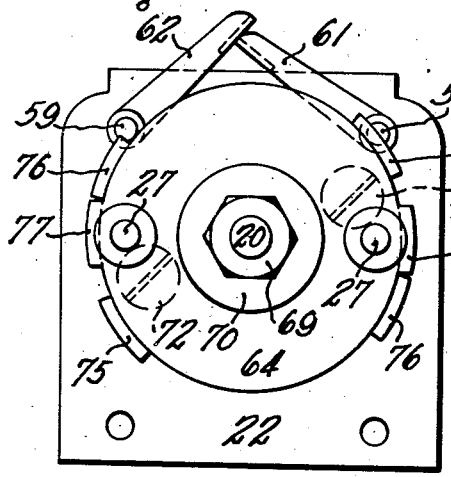
Figure 16:
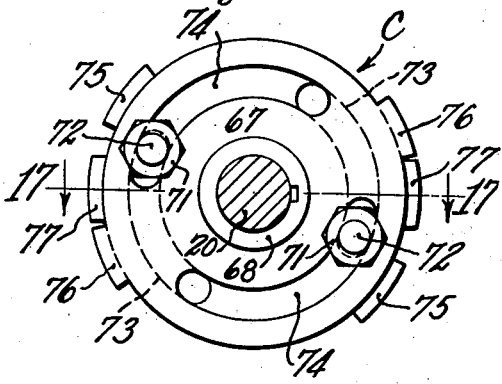
Figure 17:
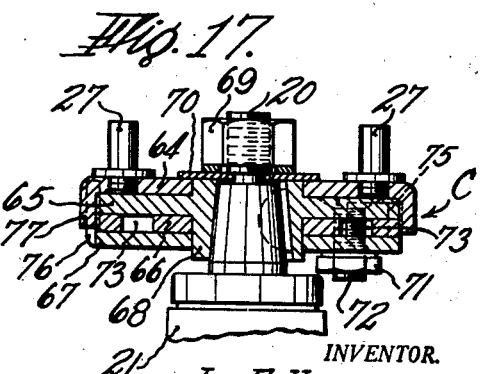

Figs. 11 and 12 are cross sectional views taken on the line 2—2 of Fig. 1 and illustrative of the same two operations shown in Figs. 9 and 10, respectively;

Fig. 13 is a cross sectional view taken on the line 13—13 of Fig. 1 and showing the parts in latching position for momentarily arresting rotation of the driven element in the opposite direction;

Fig. 14 is a cross sectional view taken just to the right of the line 13—13 of Fig. 1 and is generally similar to Fig. 13 except that the parts are shown in the positions which they occupy at the start of the latch releasing operation;

Fig. 15 is an end elevational view taken from the left hand side of Fig. 1;

Fig. 16 is a cross sectional view taken on the line 16—16 of Fig. 1;

Fig. 17 is a sectional plan view taken on the line 17—17 of Fig. 16; and

Figure 18:
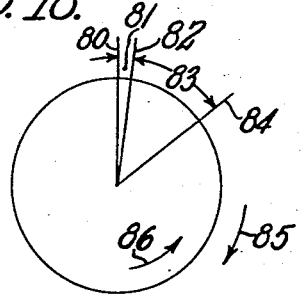

Fig. 18 is a diagrammatical view illustrative of the operation and of the relative times of ignition on forward and reverse impulse action.

Referring to Fig. 1, the impulse coupling includes a driving shaft 20, suitably mounted in a bearing 21, formed on a bracket 22 which may, as indicated, be secured to the base plate $b$ of a magneto M. The stator and rotor of the magneto are designated $s$ and $r$ respectively. The impulse coupling also includes a driven plate 23, which is substantially circular in form, except for diametrically opposed, radially projecting ears 24, each having fixed thereto an axially extending pin 25. These pins 25, and two similar ones $p$, fixed to the rotor $r$ and spaced about ninety degrees from pins 25, are adapted to engage in suitable holes in a flexible coupling disc, such as $d$, which may be of leather or other suitable material. The driven element is thus flexibly coupled to the magneto rotor.

The left hand end of the drive shaft is adapted to be connected to the power source,—usually an internal combustion engine,—and this connection is usually made through the intermediary of a similar flexible coupling, the driven pins 27 only of which are shown. Associated with this latter coupling is a special adjustable coupling, designated generally as C, which may be used to advantage for purposes later to be described.

The impulse coupling, except for the stationary abutments on which the locking dogs strike, comprises the unit shown in Figs. 4 and 5 and the unit shown in Figs. 6 and 7. The second unit telescopes within the first, with the exception of the driven plate 23. For example, the assembly shown in Fig. 7 is moved to the left and into the right hand end of the assembly shown in Fig. 5. The units, thus assembled, are slipped over the right hand end of shaft 20 and are held in place by a flanged tubular nut 28, screwed onto the threaded end of reduced diameter of the shaft, as indicated in Fig. 3. The shaft has a shoulder 29, against which a driving plate 30 is clamped by the inner end of nut 28. The shaft, where it passes through plate 30, is flattened as shown in Fig. 2, and engaged in a corresponding opening in the plate so that the shaft can effectively drive the plate.

The unit of Figs. 4 and 5 comprises, in addition to the driving plate 30, inner and outer cam-carrying sleeves 31 and 32 respectively, and a spiral drive spring 33 (Fig. 4), the ends of which are connected one to each of these sleeves. As shown, each end of the spring is rolled up into cylindrical form and such rolled up end is engaged in a recess in its sleeve. The spring lies adjacent the driving plate 30 and is housed in between the two sleeves and between the driving plate and a thin cover plate 34 (Figs. 3 and 4) which may be suitably fixed, as by pins 35 (Fig. 4).

The inner end (left hand as viewed in Fig. 3) of sleeve 31 has diametrically opposed projections 36 which, as best shown in Fig. 2, extend into arcuate slots 37 formed in the driving plate 30. The slots provide for a limited amount of relative turning movement between the plate and inner sleeve. The inner end of the outer sleeve 32 is provided with diametrically opposed recesses 38 in which a pair of lugs 39, integral with and extending radially from the circular driving plate 30, are received. These recesses provide for a limited extent of relative turning movement between the driving plate and outer sleeve. In between the recesses 38 are arc shaped lugs 40 adapted on counterclockwise rotation (as viewed in Fig. 2) of the driving plate to be engaged and driven by the lugs 39. In between the slots 37 are solid portions 41 of the driving plate which portions act as lugs to drive the lugs 36 on the inner sleeve when the driving plate turns in a clockwise direction. Thus, one sleeve or the other is positively driven by plate 30 depending on the direction in which it turns and, while one sleeve is being driven, the other will be held stationary by means to be described so that the spring 33 will be wound up by the relative turning of the sleeves. Either sleeve can be turned to effect the stressing of the drive spring. This spring is under some initial stress and thereby tends to hold the lugs 40 against lugs 39 and the lugs 36 against lugs 41. It also, by the frictional resistance afforded, tends to hold sleeves 31 and 32 against axial displacement, prior to assembly of the two units and before more positive means for the purpose are available.

The outer end (right hand as viewed in Figs. 1, 3 and 5) of sleeve 32, much like the inner end thereof, is provided with diametrically opposed, arc shaped lugs 42 and intervening recesses 43. These are best shown in Figs. 9 and 10. One of these lugs, the uppermost in Fig. 10, serves as a cam to release one of the locking dogs from its abutment at the end of the spring stressing operation. The outer end of the inner sleeve also carries a cam 44, integral therewith, which cam serves at the proper time to release the other locking dog from its abutment. Also formed on the outer end of the inner sleeve are a pair of diametrically opposed, arc shaped lugs 45.

The other unit, shown separately in Figs. 6 and 7, comprises, in addition to the driven plate 23, the two locking dogs 46 and 47 and a plate 48, which is fixed to the driven plate but is axially spaced from such plate sufficiently to provide for the reception of the locking pawl 47 therebetween. As shown, the two plates 23 and 48 are held together by rivets 49 and 49'. The rivet 49 has a spacing sleeve 50 slipped over it to hold the plates apart. The rivet 49' is a shouldered rivet, serving the same purpose and serving also as a pivot for the locking dog 47. The dog 46 is pivotally connected to plate 48 by a stud 51.

Integrally connected with each dog is a relatively large curved portion 52, disposed on the opposite side of the pivotal support and functioning as a weight. On slow rotation, the weight 52 will throw the dog radially outward as its pivot nears the uppermost point in its circle of travel. The inner end of the weight arm 52 will then abut a stop. In the case of dog 46, the stop for arm 52 is cam 44 and in the case of dog 47, the stop is sleeve nut 28, as shown in Figs. 13 and 9, respectively. On higher speeds of rotation, the weight arms will be thrown radially outwardly by centrifugal force and the locking dogs will be held retracted (within the circle defined by the outer periphery of outer sleeve 32). Stops 53 are provided on the weight arms 52 to abut the inner peripheral surfaces of lugs 42 and limit the radially outward movement of these arms.

The plate 48 resembles the drive plate 30. It has arcuate slots 54 to receive the lugs 45 of the inner sleeve 31 and projecting lugs 55 to ride in the recesses 43 of the outer sleeve 32. Between the slots 54 are inner lugs 54'.

The locking dogs 46 and 47 are adapted, when turned at low speed, to engage and be momentarily arrested by stationary abutments 56 and 57, respectively. These abutments are fixed to, preferably integral with, shafts 58 and 59 respectively. These shafts are mounted in bearing sleeves 56' and 57' respectively, which are properly positioned and suitably secured to bracket 22 (Figs. 1 and 9). The shafts 58 and 59 can be turned by hand levers 61 and 62 respectively, fixed thereto (Figs. 1 and 15). The abutments are cylindrical in form except for a flattened off surface, such as 63 (Fig. 9). When the abutments are positioned as shown, one or the other of them will be engaged by one or the other of the locking dogs, depending on the direction of rotation of shaft 20. When either of the abutments is turned so that the flat surface 63 lies adjacent to the sleeve 32, it will be cleared by its locking dog even though the latter be projected. Either or both of the abutments can be thus positioned out of the path of its locking dog. If both are thus positioned, impulse drive of the magneto will be eliminated. If impulse drive in one direction only is desired, one only of the abutments is left in the position shown and one or the other may be selected for this purpose depending on the direction of rotation of the drive shaft. If the impulse drive is desired irrespective of the direction of rotation of the shaft, both abutments are positioned as shown herein.

The plate 48 serves as the means for holding either of the sleeves 31 and 32 against rotation while the other is being turned by the drive plate 30 to stress spring 33. In the normal relative positions of these sleeves (prior to the spring stressing operation), the lugs 55 on plate 48 abut the lugs 42 on sleeve 32 and the lugs 54' on the plate abut the lugs 45 on sleeve 31 in such a way that the plate 48 cannot be turned in either direction. If now the outer sleeve 32 is turned by the driving plate 30, which will have to move in the direction of the arrow shown in Fig. 9 for this purpose, and the plate 48 be held stationary by the dog 47, the lugs 54' on plate 48 will, by engagement with lugs 45, hold the inner sleeve 31 stationary while the spring 33 is wound up. As soon as the spring stressing operation is completed, the upper lug 42 of Fig. 10 will strike dog 47 and force it inwardly, allowing the spring to relieve its stress and rapidly move the plates 48 and 23 through a substantial angle,—the lugs 45 of the inner sleeve then driving these plates through lugs 54'. If, on the other hand, the inner sleeve 31 is rotated, and its only possible rotation relative to plate 30 is in the direction of the arrow shown in Fig. 13, and plate 48 be at the same time held stationary by the engagement of dog 46 with abutment 56, then the lugs 55 will by their abutment with lugs 42 prevent rotation of the outer sleeve 32 during the spring stressing operation. At the end of such operation, cam 44 will engage the weight arm 52 of dog 46 and release it from abutment 56 (Fig. 14). Thereupon, sleeve 32 will be rapidly moved by spring 33 and will through the engagement of lugs 42 and 55 drive plate 48 and thus the driven plate 23 fixed thereto.

Referring next to the coupling, this includes a driving plate 64, to which the coupling pins 27 are fixed as shown in Fig. 17,; a driven plate 65; and two other plates 66 and 67. The plate 65 is circular and formed integrally with a central hub 68 which is keyed to the tapered end of shaft 20 and held thereon by a nut 69. The plates 64, 66 and 67 are annular in form and each is mounted to turn on hub 68. The plate 64 is held in place by nut 69 between a washer 70 and plate 65 but is not clamped against the latter and can turn relatively thereto. The plates 66 and 67 are held in place by two nuts 71 threaded, one on each of two diametrically opposed bolts 72, carried by plate 65 and having their heads countersunk into the latter plate. The plates 66 and 67 have arcuate slots 73 and 74, respectively, therethrough and each bolt 72 passes through one of the slots 73 and one of the slots 74. The bolts and slots enable relative angular adjustment between plate 65 and either or both of the plates 66 and 67. Once the plates 66 and 67 have been adjusted, they are clamped to plate 65 by the nuts 71 and turn therewith. The plates 66 and 67 have lugs 75 and 76, arranged one pair on each with the units of each pair in diametrically opposed relation. These lugs are bent from the peripheries of their respective plates to lie at right angles thereto and extend toward the driving plate 64. The latter has a pair of similar lugs 77 extending toward plates 66 and 67 and lying between the lugs 75 and 76. The plate 64, being driven from the engine, or other power source, drives the coupled plates 65, 66 and 67 through the abutment of the lugs 77 with the lugs 75 or the lugs 76 depending on the direction of rotation.

There may or may not, according to the adjustment of plates 66 and 67, be lost motion between each lug 77 and the immediately adjacent pair of lugs 75 and 76. The coupling is susceptible of such adjustment as to eliminate this lost motion. However, this lost motion is a desirable and important characteristic of the coupling when combined, as here, with a double acting impulse coupling functioning on both normal forward rotation and reverse rotation as well. It has a definite function and contributes to the performance of the desired work by the impulse coupling. For example, assuming that the directional arrow of Fig. 10 shows the normal direction of revolution of the engine, the lugs 77 would be engaged with lugs 75 to drive shaft 20 in this direction. Fig. 10 shows the parts positioned at approximately the time for the forward impulse and the ensuing production of a spark by the magneto. Fig. 14 shows the same condition for the reverse impulse and by comparing the relative positions of shaft 20 in these two figures it will be seen that the impulse or sparking points for forward and reverse drive are angularly separated. This angular distance of separation is fixed. But the coupling C allows variation of this angular distance by its lost motion provisions. Thus, on reverse rotation, the engine shaft will move through an appreciable angle before lugs 77 strike lugs 76 and this angle, added to the fixed angle above described, will increase the range between the two impulse points. The coupling C also enables the impulse coupling and connected magneto rotor to be adjusted for timing purposes relative to the engine. The lost motion provision, however, is the characteristic which combines with the impulse coupling to solve the present problem of providing for impulse drive on both forward and reverse rotation of the engine crankshaft.

The present invention has been developed to meet a particular need in connection with single cylinder, two cycle engines. Such engines frequently are difficult to start. Often the compression is so high that it is practically impossible to turn them over by hand for starting purposes. That is, they cannot easily be cranked in the ordinary way by turning the crankshaft in the direction of its normal rotation. But such engines can be started by rocking them against compression, i. e., by turning them as far as possible in a direction contrary to the normal direction of rotation and then igniting the charge in the cylinder. The high degree of compression precludes the rocking back of the engine piston to its normal position for firing, so the "reverse impulse" must act at a different point in the engine cycle from the "forward impulse",—usually at a point in the upstroke of the piston substantially before top dead center position is reached. For example, in Fig. 18 the line 80 represents top dead center position of the engine piston; the line 82 may be assumed to be the firing position of the piston for forward impulse drive; and the line 84 the firing position of the piston for reverse impulse drive. On forward impulse drive, as distinguished from direct drive without impulse action, the spark would occur a little after dead center, say for example the interval represented by the angle 81. The arrow 85 represents the normal direction of rotation of the engine crankshaft. To start the engine by rocking against compression, the crankshaft is turned in the directing of arrow 86. Due to high compression, the piston cannot be forced back further than the position 84. When it reaches that position, the reverse impulse will function and ignition occurs. The explosion will suffice to move the piston in the direction of arrow 85 and kick it over top dead center to the position 82 at which the "forward" impulse will function. The operation of the engine then continues in the normal way.

It will be appreciated that the reverse impulse firing position, represented by line 84, cannot be accurately predetermined. It will vary in different engines, not only in different makes of engines but in different engines of the same make. In some cases, the piston cannot be rocked back against compression as far as it can be in others. Therefore, it is essential to provide for adjusting the reverse impulse firing position to met the requirements of the particular engine with which the impulse coupling and magneto are to be used. Even if it be assumed that the fixed angle of separation between the forward and reverse impulses is designed to suit the most favorable condition, i. e. when the piston can be rocked back against compression to the greatest extent, then the lost motion provision enables the aforesaid angle of separation to be increased to meet conditions where the piston cannot be rocked back against compression so far. Thus, the coupling C is an important factor in making the double acting impulse coupling commercially satisfactory. Without it, the reverse impulse could not be varied in time, as it must be, to meet the varying conditions encountered.

As a practical matter, when the magneto is driven at engine speed, the lost motion provision is usually necessary. While there is no difficulty, insofar as the impulse coupling construction is concerned, in increasing the angle of separation of the forward and reverse impulses, the magneto imposes limitations which preclude, as a practical matter, a greater angle of separation than that shown and such angle is usually not enough, wherefore it has to be pieced out by means of the lost motion provision. The magneto difficulties need not be considered here in detail. It will suffice to say that the impulses need to be produced when the magneto rotor occupies certain positions relative to its stator, within certain limited ranges. To increase the angle of separation beyond that shown would cause the reverse impulse to occur at a time when the rotor is positioned outside said range and the impulse, while mechanically effective, would be futile for ignition purposes because of the then existing unfavorable electrical and magnetic conditions. As a practical matter then, the coupling C is necessary, where the magneto runs at engine speed, and it contributes to the work of the impulse coupling and cooperates in such work by making possible the occurrence of the reverse impulse at the proper time to suit the engine requirements and at the proper time to suit the electrical and magnetic conditions of the magneto.

In operation, if the engine is of the special class to be started in the special manner stated, both handles 61 and 62 would, unless already so positioned, be moved into the positions shown so that effective stationary abutments are available for arresting the locking dogs. Assuming, for example, that the arrows of Figs. 9 and 10 indicate the forward direction of rotation of the impulse coupling and the normal direction of rotation of the engine crankshaft, the latter will first be turned in an opposite direction, indicated by arrow 86 in Fig. 18 and by the arrows of Figs. 13 and 14. As the crankshaft is turned too slowly for the weight arms 52 to be thrown outward by centrifugal force, the locking dogs 46 and 47 will be projected into the path of their respective abutments as their pivots near the upper part of their circular paths of travel. Dog 47 will not latch on its abutment 57 when the coupling turns in the described direction, but dog 46 will eventually abut and be arrested by its abutment 56. This condition is shown in Fig. 13. By reference to Fig. 2, it will be seen that continued rotation of the engine crankshaft in a reverse direction (clockwise in Fig. 2 because this figure is taken from a direction opposite to Figs. 13 and 14) the drive plate 30 will turn lugs 36 and drive the inner sleeve 31 which carries cam 44 and lugs 45. From Fig. 14, it will be seen that lugs 45 can move in the stated direction while plate 48 is held stationary by dog 46. This plate, by its lugs 55, holds the outer sleeve 32 stationary. Thus, the spring 33 which is fixed at its extremities to sleeves 31 and 32, is placed under stress by the relative movement of these sleeves. As the inner sleeve continues to turn, the cam 44 thereon eventually engages the weight arm 52 on dog 46 and causes the latter to be moved inwardly and out of engagement with the abutment 56. Thereupon, the stressed spring suddenly moves the sleeve 32 ahead and with it the plate 48 until lugs 45 abut lugs 54'. The coupling parts are then restored to their original position. The spring impulse imparted to plate 48 is communicated to the magneto rotor through plate 23 and the coupling elements 25, d and p to the magneto rotor.

The result of the above action is the production of an ignition spark at a point in the upstroke of the piston substantially ahead of top dead center, say for example, at the position 84 shown in Fig. 18. The resulting explosion usually suffices to kick the engine over top dead center position in the normal direction of engine rotation indicated by arrow 85 in Fig. 18 and by the arrows in Figs. 9 to 12. Figs. 11 and 12 are taken in a direction opposite from that in which Figs. 9 and 10 are taken, wherefore the arrows are reversed.

With the crankshaft now turning in the normal direction and still at low speed, the locking dog 47 will eventually engage its abutment 57. Dog 46, obviously, will not be arrested by its abutment 56. The result is an arresting of plate 48 in the position shown in Fig. 9. Plate 48 will prevent rotation of the inner sleeve 31 because the lugs 45 thereon abut lugs 54' on the plate. The inner sleeve, and thus one end of the drive spring 33, are held stationary. By reference to Fig. 11, it will be seen that the drive plate 30, when turning in the direction shown, cannot turn sleeve 31 because lugs 36 are free to travel in slots 37. But plate 30, through the engaged lugs 39 and 38, will turn the outer sleeve 32 and wind up the drive spring 33. This spring stressing operation continues until the parts reach the positions shown in Figs. 10 and 12. Then the forward end of upper lug 42 acts like a cam on dog 47 and forces it inwardly, releasing it from abutment 57. Thereupon, spring 33 drives the inner sleeve forwardly with great rapidity until lugs 36 are moved back into their original positions of abutment with lugs 41 of the drive plate. The inner sleeve, to which the spring impulse is thus imparted, drives by the engaged lugs 45 and 54' the plate 48 and thus the attached plate 23 and the magneto rotor $r$.

The result of this action is the production of an ignition spark, say at the point 82 of Fig. 18, to propel the engine piston and turn the crankshaft in its normal direction. The forward acting impulses continue to be produced in succession until the engine attains sufficient speed so that dogs 46 and 47 are automatically retracted by centrifugal action or until these dogs are manually rendered ineffective by moving the abutments 56 and 57 out of the way by the handles 61 and 62. Either or both impulse devices can be rendered ineffective by such manual control.

The invention combines in a single unitary structure of small compass (not materially larger than any ordinary impulse coupling) provisions for the production of impulses on both forward and reverse rotation. Either or both can be used as desired but, as above stated, both are desirably used for the work of starting engines which have been difficult to start manually in any such simple way as that herein set forth.

I believe myself to be the first to provide such a structure and I desire to claim my invention in the broadest possible legal manner.

What I claim is:

1. In an impulse coupling, driving and driven elements, means intermittently operable on rotation of the driven element in either direction to arrest it during a predetermined angular interval of movement of the driving element and release it for rotation at the end of such interval, and resilient means interposed between said elements and stressable by their relative movement on rotation of the driving element in either direction.

2. In an impulse coupling, driving and driven elements, resilient means operatively interposed between said elements to be stressed by relative rotation thereof, and means intermittently operable on rotation of the driven element in either direction to arrest it during a predetermined angular interval of rotation of the driving element irrespective of the direction of rotation of the latter and to release it at the end of such interval.

3. In an impulse coupling, driving and driven elements, resilient means operatively interposed between said elements to be stressed by relative rotation thereof, means intermittently operable on rotation of the driven element in one direction to arrest it at a predetermined point in the cycle of rotation of the driving element and hold it stationary during a predetermined angular interval of movement of the driving element, and means intermittently operable on rotation of the driven element in the opposite direction to arrest it at a different predetermined point in the cycle of rotation of the driving element and hold it stationary during a predetermined angular movement of the driving element.

4. In an impulse coupling, driving and driven elements, resilient means operatively interposed between said elements to be stressed by relative rotation thereof, means intermittently operable on rotation of the driven element in one direction to arrest it and hold it stationary during a predetermined angular interval of movement of the driving element, means intermittently operable on rotation of the driven element in the opposite direction to arrest it and hold it stationary during a predetermined angular interval of movement of the driving element, means for releasing the first arresting means at one point in the cycle of rotation of the driving element, and means for releasing the other arresting means at a different point in said cycle.

5. In an impulse coupling, driving and driven elements, resilient means operatively interposed between said elements to be stressed by relative rotation thereof, means intermittently operable on rotation of the driven element in one direction to arrest it and hold it stationary during a predetermined angular interval of movement of the driving element, means intermittently operable on rotation of the driven element in the opposite direction to arrest it and hold it stationary during a predetermined angular interval of movement of the driving element, means for releasing the first arresting means at one point in the cycle of rotation of the driving element, means for releasing the other arresting means at a different point in said cycle, and means for coupling the driving element to a power source, said coupling means including lost motion provisions for producing in the cycle of rotation of the power source an effective increase in the angular separation of the releasing points.

6. In an impulse coupling, driving and driven elements, resilient means operatively interposed between said elements to be stressed by relative rotation thereof, means intermittently operable on rotation of the driven element in one direction to arrest it and hold it stationary during a predetermined angular interval of movement of the driving element, means intermittently operable on rotation of the driven element in the opposite direction to arrest it and hold it stationary during a predetermined angular interval of movement of the driving element, means for releasing the first arresting means at one point in the cycle of rotation of the driving element, means for releasing the other arresting means at a different point in said cycle, and means for coupling the driving element to a power source including lost motion provisions for varying relative to the cycle of rotation of the power source the angular interval between said releasing points.

7. In an impulse coupling, driving and driven elements, means effective irrespective of the direction of rotation of the driven element to arrest it and hold it stationary during a predetermined angular movement of the driving element, and a drive spring operably interposed between said elements and stressable by the rotation of the driving element in either direction during the intervals when the driven element is held stationary.

8. In an impulse coupling, driving and driven elements, a pair of relatively rotatable members, a drive spring interconnecting said members and stressable by their relative rotation, connections between the driving element and each member for selectively driving one or the other according to the direction of rotation of the driving element, connections between the driven element and each member for selectively connecting such element to be driven from one or the other member according to the direction of rotation of the driving element, and means on the driven element for intermittently arresting its rotation irrespective of the direction thereof during a predetermined angular movement of the driving element.

9. In an impulse coupling, relatively rotatable members, a drive spring fixed at its extremities one to each of said members, a driving element operable when rotating in one direction to positively drive one of said members and when rotating in the other direction to positively drive the other of said members, a driven element, means intermittently operable to hold said driven element against rotation irrespective of its direction of rotation during a definite angular movement of the driving element, and means fixed to the driven element for holding one of said members against relative rotation in one direction and for holding the other of said members against relative rotation in the other direction.

10. In an impulse coupling, inner and outer cylindrical sleeves, a drive shaft on which the inner sleeve is mounted with freedom to turn, a drive spring interconnecting said sleeves and stressable on relative rotation of the same, driving and driven plates of substantially circular form mounted on said shaft in fixed and rotatable relation respectively, each plate being interengaged with both sleeves and said plates being disposed one near each end of the sleeves, the driving plate being interengaged with said sleeves so as to turn the inner and not the outer when rotating in one direction and to turn the outer and not the inner when rotating in the other direction, the driven plate being interengaged with said sleeves so as to be turned by the outer when the inner is driven by the driving plate and by the inner when the outer is driven by the driving plate, and means on the driven plate intermittently operable irrespective of its direction of rotation to hold it stationary during a predetermined angular interval of movement of the driving plate.

11. In an impulse coupling, inner and outer cylindrical sleeves, a drive shaft on which the inner sleeve is mounted with freedom to turn, a drive spring interconnecting said sleeves and stressable on relative rotation of the same, driving and driven plates of substantially circular form mounted on said shaft in fixed and rotatable relation respectively, each plate being interengaged with both sleeves and said plates being disposed one near each end of the sleeves, the driving plate being interengaged with said sleeves so as to turn the inner and not the outer when rotating in one direction and to turn the outer and not the inner when rotating in the other direction, the driven plate being interengaged with said sleeves so as to be turned by the outer when the inner is driven by the driving plate and by the inner when the outer is driven by the driving plate, means on the driven plate intermittently operable irrespective of its direction of rotation to hold it stationary during a predetermined angular interval of movement of the driving plate, and cams one on each sleeve for releasing the driven element from the holding means at the end of said interval, one of said cams operative when the driving element rotates in one direction and the other when the driving element rotates in the other direction.

12. In an impulse coupling, inner and outer cylindrical sleeves, a drive shaft on which the inner sleeve is mounted with freedom to turn, a spiral drive spring coiled in the space between said sleeves and fixed at its ends one to each sleeve, said spring being stressable on relative rotation of the sleeves, driving and driven plates of substantially circular form mounted on said shaft in fixed and rotatable relation respectively, each plate being interengaged with both sleeves and said plates being disposed one near each end of the sleeves, the driving plate being interengaged with said sleeves so as to turn the inner and not the outer when rotating in one direction and to turn the outer and not the inner when rotating in the other direction, the driven plate being interengaged with said sleeves so as to be turned by the outer when the inner is driven by the driving plate and by the inner when the outer is driven by the driving plate, and means on the driven plate intermittently operable irrespective of its direction of rotation to hold it stationary during a predetermined angular interval of movement of the driving plate.

13. In an impulse coupling, relatively rotatable tubular members positioned one within the other in radially spaced and concentric relation, a drive spring coiled in the space between said members and fixed at its extremities one to each of said members, a driving element operable when rotating in one direction to positively drive one of said members and when rotating in the other direction to positively drive the other of said members, a driven element, means intermittently operable to hold said driven element against rotation irrespective of its direction of rotation during a definite angular movement of the driving element, and means fixed to the driven element for holding one of said members against relative rotation in one direction and for holding the other of said members against relative rotation in the other direction.

14. In an impulse coupling, relatively rotatable tubular members positioned one within the other in radially spaced and concentric relation, a drive spring coiled in the space between said members and fixed at its extremities one to each of said members, a driving element operable when rotating in one direction to positively drive one of said members and when rotating in the other direction to positively drive the other of said members, a driven element, means intermittently operable to hold said driven element against rotation irrespective of its direction of rotation during a definite angular movement of the driving element, and means fixed to the driven element for holding one of said members against relative rotation in one direction and for holding the other of said members against relative rotation in the other direction, said driving and driven elements disposed on opposite sides of said spring and cooperating with said members to provide a housing therefor.

15. In an impulse coupling, a drive shaft, a driving plate fixed thereto, an inner sleeve turnable on said shaft and having a lug and slot engagement with the driving plate permitting a limited degree of relative rotation when the plate is turned in one direction and affording a positive driving connection between the plate and sleeve when the plate is turned in the other direction, an outer sleeve telescoped over the inner sleeve in radially spaced and concentric relation and having a lug and slot engagement with the driving plate permitting a limited degree of relative rotation when the plate is turning in the direction to drive the inner sleeve and affording a positive driving connection between the plate and sleeve when the plate is turning in the other direction, a drive spring interconnecting the sleeves and stressed on relative movement thereof, a driven plate turnable on the drive shaft, means on the driven plate intermittently operable irrespective of its direction of rotation for arresting it and holding it stationary during a predetermined angular interval of movement of the drive shaft, said driven plate having a lug and slot engagement with both sleeves permitting a limited degree of rotation of either sleeve when that sleeve is driven by the driving plate and preventing rotation of either sleeve when that sleeve is not so driven, and means for releasing the driven plate from its arresting means at the end of said interval.

16. In an impulse coupling, a drive shaft, a driving plate fixed thereto, an inner sleeve turnable on said shaft and having a lug and slot engagement with the driving plate permitting a limited degree of relative rotation when the plate is turned in one direction and affording a positive driving connection between the plate and sleeve when the plate is turned in the other direction, an outer sleeve telescoped over the inner sleeve in radially spaced and concentric relation and having a lug and slot engagement with the driving plate permitting a limited degree of relative rotation when the plate is turning in the direction to drive the inner sleeve and affording a positive driving connection between the plate and sleeve when the plate is turning in the other direction, a drive spring interconnecting the sleeves and stressed on relative movement thereof, a driven plate turnable on the drive shaft, means on the driven plate intermittently operable irrespective of its direction of rotation for arresting it and holding it stationary during a predetermined angular interval of movement of the drive shaft, said driven plate having a lug and slot engagement with both sleeves permitting a limited degree of rotation of either sleeve when that sleeve is driven by the driving plate and preventing rotation of either sleeve when that sleeve is not so driven, and cams one on each sleeve for effecting release of the driven plate from its arresting means at the end of said interval, each cam being operable for the purpose only when its sleeve is positively driven by said driving plate.

In testimony whereof I have affixed my signature.

IRA E. HENDRICKSON.